US008448022B1

(12) United States Patent
Scott (10) Patent No.: US 8,448,022 B1
(45) Date of Patent: May 21, 2013

(54) FAULT RECOVERY TO A CALL STACK POSITION STORED IN THREAD LOCAL STORAGE

(75) Inventor: Micah Elizabeth Scott, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 400 days.

(21) Appl. No.: 12/912,297

(22) Filed: Oct. 26, 2010

(51) Int. Cl.
*G06F 11/00* (2006.01)

(52) U.S. Cl.
USPC .................................. 714/16; 714/17; 718/1

(58) Field of Classification Search ........................ None
See application file for complete search history.

(56) References Cited

U.S. PATENT DOCUMENTS

| 6,154,877 | A | * | 11/2000 | Ramkumar et al. | 717/114 |
| 6,625,726 | B1 | * | 9/2003 | Clark et al. | 712/245 |
| 6,654,906 | B1 | * | 11/2003 | Arndt | 714/11 |
| 2003/0023905 | A1 | * | 1/2003 | Boling | 714/34 |
| 2005/0246693 | A1 | * | 11/2005 | Plum | 717/140 |
| 2008/0148399 | A1 | * | 6/2008 | Winkler | 726/22 |
| 2008/0270831 | A1 | * | 10/2008 | Niwa | 714/15 |
| 2009/0113424 | A1 | * | 4/2009 | Chen et al. | 718/1 |
| 2011/0225402 | A1 | * | 9/2011 | Grisenthwaite | 712/244 |

OTHER PUBLICATIONS

Zhang et al., "Transparent Checkpointing and Rollback Recovery Mechanism for Windows NT Applications", Apr. 2001, ACM SIGOPS Operating Systems Review.*

* cited by examiner

*Primary Examiner* — Gabriel Chu (57) ABSTRACT

After execution by a thread of an instruction for invoking a function containing unreliable code, a pointer is stored to thread local storage for the thread in one or more reserved registers. The thread local storage is a portion of memory of the computing device associated with the thread. In the thread local storage, a stack pointer is stored to a position in a call stack associated with the instruction for invoking the function. The function is called, thereby causing the function to execute. In response to a fault occurring in the function, the pointer to thread local storage is used to retrieve the stack pointer in the thread local storage. The position in the call stack is used in a recovery process for the fault.

24 Claims, 9 Drawing Sheets

```
400
                                     ...
         Call site 302  { 303 { 01 ret = vmFoobar(a, b, c);
                                     ...
                        ┌ 305 { 02   /* Compiler hint: Save %edi */
                        │ 306 { 03   trampoline_Foobar(a, b, c);
         Inlined macro 304          04   mov $0, %edi
                        │ 328 { 05   mov %eax, ret
                        └
                                     ...
                        ┌        ┌ 06   mov %gs:0, %eax
                        │ 308 {  └ 07   lea <offset>(%eax), %edi
         Trampoline 108 │        ┌ 08   mov %esp,   (%edi)
                        │ 310 {  └ 09   mov %ebp, 4(%edi)
                        └ 312 { 10   jmp <offset>
                                     ...
                                   11   foobar(a, b, c) {
         Library function 106{ 314 { 12   /* Crash */}
                                     ...
                        ┌        ┌ 13   tls = GetThreadLocalStorage()
                        │        │ 14   savedESP = tls[0]
                        │        │ 15   savedEBP = tls[4]
         Handler 316    │ 318 {  │ 16   retAddr = savedESP[0]
                        │        │ 17   callSite = retAddr[-5]
                        │        │ 18   trampoline = retAddr[-4] + retAddr
                        │        │ 19   funcInfo = LookupTrampoline(trampoline)
                        └        └ 20   CrashHandler(tls, funcInfo)
                                     ...
                        ┌ 320 { 21   /* Save fault information */
         Crash handler 322
                        └ 324 { 22   /* Recover gracefully */
                                     ...
                        ┌        ┌ 23   %esp = savedESP
         Handler 316    │ 326 {  │ 24   %ebp = savedEBP
                        └        └ 25   return
```

FAULT RECOVERY TO A CALL STACK POSITION STORED IN THREAD LOCAL STORAGE

BACKGROUND

Software programs use libraries as reusable program modules. These libraries may be the source of faults (e.g., crashes and bugs). Libraries may be dynamically linked with the software program. For example, a loading process is performed where application code (e.g., executables) from the software program is loaded into memory. Libraries that may be called by the application code are also loaded and dynamically linked with the application code. The dynamic linking process uses a procedure linkage table (PLT) that indirectly jumps from a fixed virtual address to the dynamic address where the library functions are located in memory.

When the application code needs to call a library function, the procedure linkage table is used to account for the dynamic location of the library function. For example, the dynamic linker modifies the PLT (or a separate Global Offset Table) with the final virtual address of each procedure that can be invoked in each loaded library. The program then jumps into the PLT entry for a library function from a call site in the application code. While executing instructions from the library function, a fault may occur. When the fault occurs, a way to safely recover from the fault may not be provided, which can result in a crash of the entire program. Also, for debugging purposes, there may not be a way to determine the call site from which the library function was entered.

In other examples, the call site may be determined using existing techniques. For example, the functions "setjmp" and "longjmp" (in C, or similar instructions in other programming languages) may be used to store a current execution state in thread local storage for a thread that is being used by a process executing the application code. The setjmp function saves the environment of the calling function into a data structure. The longjmp function can then use this structure to jump back to the call site of the calling function. The longjmp function allows the program to jump out of a number of function calls to the call site.

In order to use setjmp to store the environment of the calling function, additional code must be executed prior to each library function call. This code may be included prior to each call site, or it may be present in a wrapper function. Each library function is associated with a separate wrapper function, each of which requires distinct binary code in the software program. The wrapper requires multiple parameters that are not known at the time of coding, and thus have to be looked up by the wrapper function during runtime. For example, a thread-specific location in which the setjmp execution state is to be stored, and an address of the library function are not known. Thread local storage is looked up using an operating system specific method, and the library function address is stored in a separate data table.

This wrapper function adds an extra level of indirection due to the function call. Local variables are typically required for storing the address of thread local data, or for the parameter passed to setjmp. The wrapper requires its own stack frame for these local variables, and this stack frame is distinct from the frame which the program code at the call site constructed with its parameters for the library call itself. Having a separate stack frame, the wrapper must copy all arguments from the previous frame to the next. This adds a layer of indirection in the software program, amounting to one extra copy of each parameter and one extra function call. Also, the setjmp function may be able to save information in thread local storage for the call site. However, every register is saved, which saves additional information other than what is needed to determine the call site. Although the setjmp function and thread local storage may be used to determine the call site, these functions are considered slower function calls and also add overhead due to the high number of additional instructions that must be executed for each library call.

Unless otherwise indicated herein, the approaches described in this section are not prior art to the claims in this application and are not admitted to be prior art by inclusion in this section.

SUMMARY

In one embodiment, a method executes, using a computing device, a function that contains unreliable code. After execution by a thread of an instruction for invoking the function, a pointer is stored to thread local storage for the thread in one or more reserved registers. The thread local storage is a portion of memory of the computing device associated with the thread. In the thread local storage, a stack pointer is stored to a position in a call stack associated with the instruction for invoking the function. The function is called, thereby causing the function to execute. In response to a fault occurring in the function, the pointer to thread local storage is used to retrieve the stack pointer in the thread local storage. The position in the call stack is used in a recovery process for the fault.

The following detailed description and accompanying drawings provide a more detailed understanding of the nature and advantages of the present invention.

DETAILED DESCRIPTION

In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
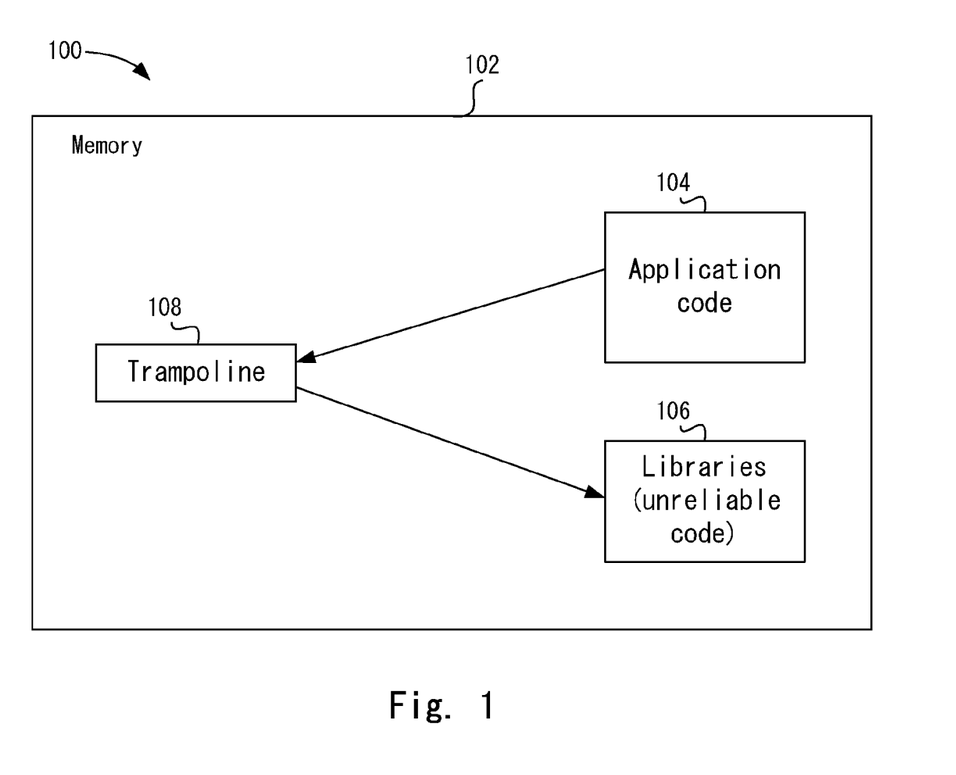
FIG. 1 depicts an example of a computing system according to one embodiment.

FIG. 1 depicts an example of a computing system 100 according to one embodiment. Different computer systems may be used, such as a virtualized computer system. In one embodiment, a hosted virtualization architecture is used; however, a non-hosted virtualization architecture or an architecture without virtualization may also be used. A specific example of a hosted virtualization architecture will be described below.

In computer system 100, a memory 102 includes application code 104 and libraries 106. Application code 104 may be part of a software program that is being executed by computer system 100. Libraries 106 provide reusable code modules to the programs and be code in which a fault may occur while the library is being executed. The term "libraries" is used for discussion purposes, but particular embodiments may be used with code other than libraries where a fault might occur. For example, libraries 106 include unreliable code, which may be code that may be associated with a third party different from an entity associated with application code 104. In one example, libraries 106 may be code that is provided by a host operating system independent software vendor (OS ISV) or an independent hardware vendor (IHV). In other embodiments, libraries 106 may not be code associated with a third party, but may be code associated with an entity that developed application code 104.

Libraries 106 may include a number of library functions. Each library function may perform a different service. Different application code 104 may use a subset of library functions during execution.

When application code 104 calls a library function in libraries 106, a trampoline 108 may be called. Trampoline 108 may be a piece of code that is jumped into and then jumped out of. For example, application code 104 jumps into trampoline 108 and then trampoline 108 causes a jump to the library function in libraries 106.

Trampoline 108 stores recovery information that may be used when a fault occurs during execution in the library function. For example, the recovery information, such as stack pointer to a call site in the call stack for the calling function, is used to determine where the original calling function is in application code 104. Particular embodiments use a process that reserves one or more registers for use during the function call. The registers store a thread local storage (TLS) pointer to thread local storage. Then, the stack pointer is stored in thread local storage. By using thread local storage to store the stack pointer, an extra entry on the call stack for a function to save the execution state (e.g., a setjmp function) is avoided. When a fault occurs, thread local storage is identified using the TLS pointer and the stack pointer is retrieved. The stack pointer is then used to determine the calling function. After identifying the calling function, particular embodiments allow for a graceful recovery. For example, because the calling function is known, execution of application code 104 may resume at an instruction after the calling function. Further, certain recovery actions may be taken, such as logging the fault and modifying trampoline 108 to alter library calls.

Figure 2:
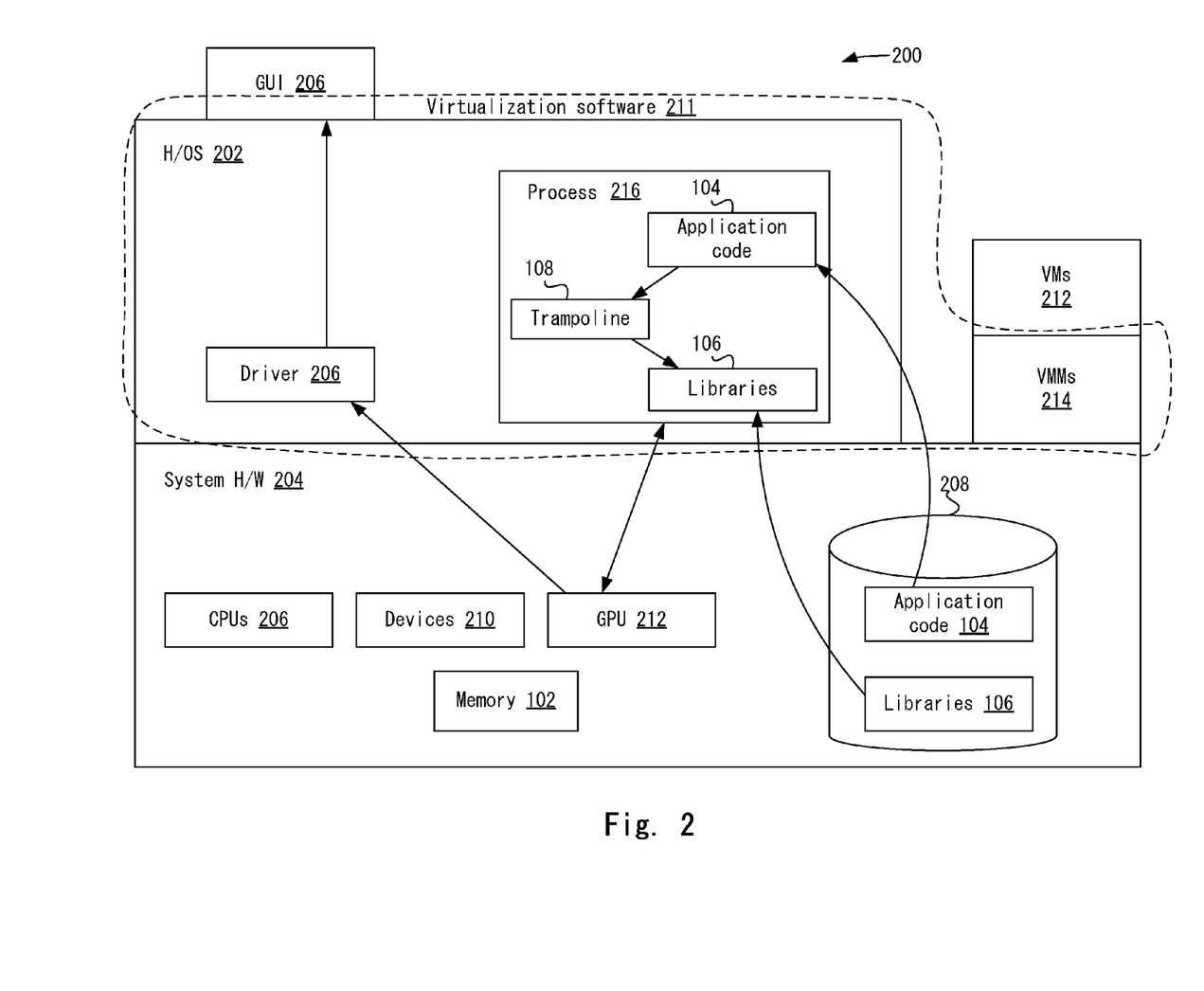
FIG. 2 depicts an example of a virtualized computer system according to one embodiment.

FIG. 2 depicts an example of a virtualized computer system 200 according to one embodiment. In this example, virtualized computer system 200 is a hosted virtualization architecture. However, any system in which a particular process calls unreliable code (i.e., code that is susceptible to faults) may be used.

In the hosted configuration, virtual machine monitors (VMMs) 214 run directly on system hardware 204 along with host operating system 202. In a hosted virtualized computer system, an existing, general-purpose operating system forms "host" operating system 202 that is used to perform certain input/output (I/O) operations, alongside and sometimes at the request of VMM 214. System hardware 204 may include components such as central processing units (CPUs) 206, disk memory 208, a graphics processing unit (GPU) 212, and other devices 210. System hardware 204 may include other components aside from those specifically mentioned, and such omissions are for the purpose of not obscuring the most relevant elements of system 200 and should therefore not be construed as being limiting in any way.

Virtualization software 211 is executing on system hardware 204, as shown conceptually in FIG. 2. Virtualization software 211 is shown conceptually in FIG. 2 as running "on top of" system hardware 204. Virtualization software 211 enables execution of a plurality of virtual machines (VMs) 212 (only one shown) in a well-understood manner.

Each virtual machine 212 is an abstraction of a physical computer system, having virtual hardware. In addition, each VM 212 includes guest system software, which includes a guest operating system (not shown) and any number of applications. Instructions executing on virtual processor cores may in fact be directly executed on CPUs 206 or GPU 212, but under the direction and control of virtualization software 211.

Virtual machine 212 may have a process 216 running in host operating system 202. A number of virtual machines 212 may each have corresponding processes 216 running; however, only one virtual machine 212 and one process 216 is described herein for discussion purposes. In one example, process 216 may be a virtual machine extension (VMX). In one embodiment, particular embodiments may be used in graphics processing. Process 216 may communicate with graphics processing unit (GPU) 212 to render graphics on graphical user interface (GUI) 222 through driver 206. Although graphics processing is described, other processing may also be used.

Particular embodiments protect VM 212 from faults that may occur during runtime in process 216. For example, a graceful recovery may be performed to allow a program to continue execution after a fault, e.g., in a graphics library 106 provided by a 3rd-party manufacturer of GPU 212. Additionally, recovery information, as described in more detail below, may be used to debug any faults that occur.

Process 216 is an instance of a computer program that is being executed on behalf of VM 212. For example, during runtime, application code 104 of the program may be loaded from disk 208. Application code 104 may be executable code including machine code instructions to be executed by CPU 206 or GPU 212. Application code 104 may be loaded into user space in H/OS 202, which may be an area of memory 102 where application executable code is stored. Additionally, a subset of libraries 106 are loaded into the user space from disk 208 that may be used by application code 104. The subset of libraries includes library functions that are referenced by application code 104. In one embodiment, when libraries 106 are loaded into process 216, a dynamic linking is not performed. That is, in this embodiment, a procedure linking table is not used to store addresses that identify where libraries 106 are located.

When a calling function in application code 104 calls a library function in libraries 106, trampoline 108 may be dynamically generated. For example, trampoline 108 may be generated when the library function is loaded into the user space. Although dynamic generation of trampoline 108 is described, in alternate embodiments, trampoline 108 is not dynamically generated. For example, trampoline 108 may be found in the binary for application code 104.

Figure 3:
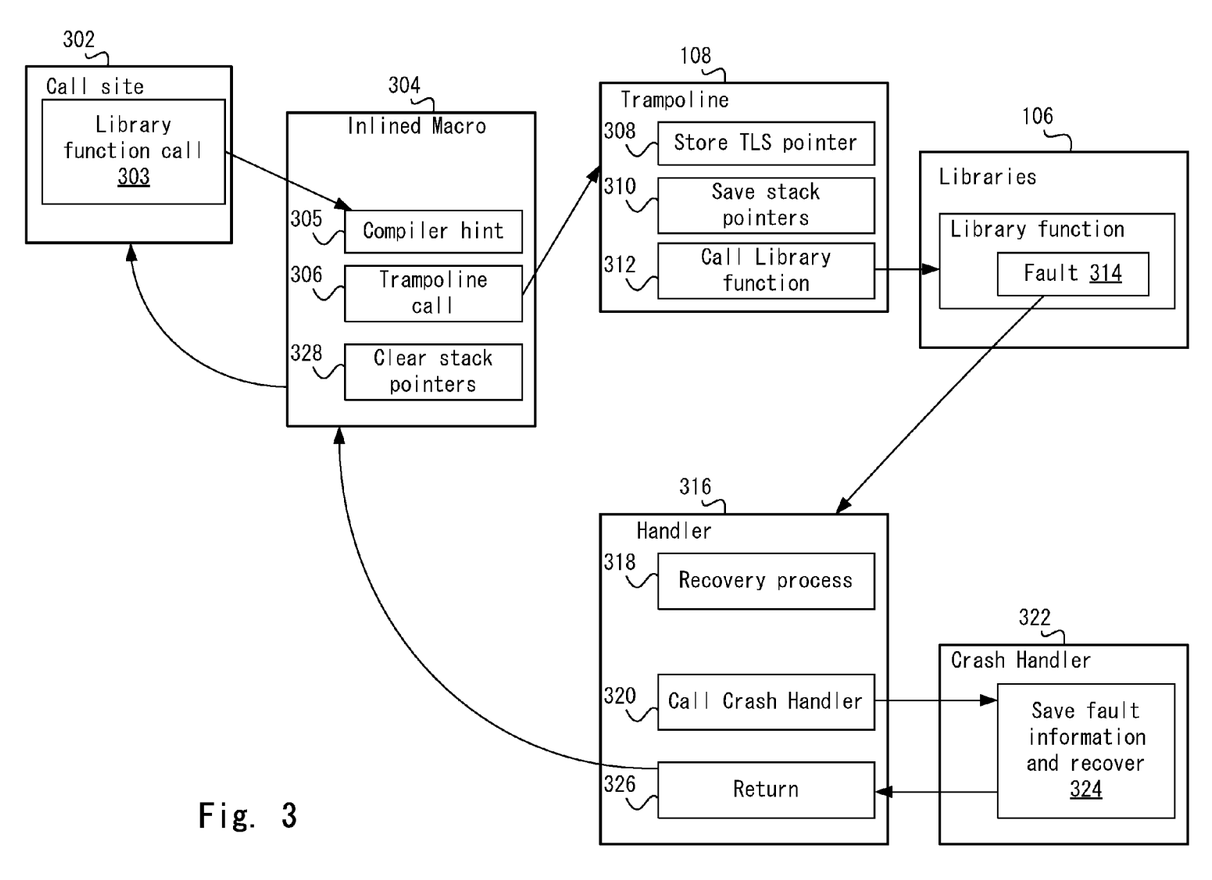
FIG. 3 depicts a flow of events for a library function call according to one embodiment.

A sequence of events for a library function call using trampoline 108 will now be described. FIG. 3 depicts a flow of events for a library function call according to one embodiment. A call site 302 may refer to an instruction that calls a function. A library function call is shown at 303. An inlined macro 304 is inserted by the compiler at call site 302. Inlined macro 304 may be a set of instructions that is inserted in application code 104 when the function is called. At 305, inlined macro 304 uses a compiler hint to reserve one or more (e.g., 1-2) storage locations, such as overhead registers, for the function call. For example, inlined macro 304 may hint to a compiler that 1-2 overhead registers will not be preserved across the function call. By hinting that the 1-2 overhead registers will not be preserved across the function call, the compiler does not use these registers. Depending on the properties of the surrounding instructions, the compiler may plan to use other storage in place of these reserved registers. In this way, the compiler hint can reserve registers with little or no performance penalty. This is not required, however. In another embodiment, the inlined macro includes instructions to save and restore the 1-2 overhead registers. Thus, registers may be reserved for use by trampoline 108 during the function call. In one embodiment, a single register is reserved, but multiple registers may be reserved in alternate embodiments. At 306, inlined macro 304 then jumps to trampoline 108.

In hooking the function call, the functionality of a library call is enhanced by trampoline 108. In one embodiment, only function calls into unreliable code, e.g., error prone code from third-party libraries, is hooked in this manner. At 308, trampoline 108 uses the reserved registers to store information, such as the thread local storage (TLS) pointer that identifies a location for thread local storage (not shown). Thread local storage may be local storage to a thread (or any unit of processing) that is executing in process 216. Process 216 may be made up of multiple threads of execution that execute instructions concurrently. A thread may execute an instruction in application code 104 that calls a library function. The thread that is executing the instruction that makes the library function call is associated by the operating system with resources, such as thread local storage, that is specific to that thread, despite the fact that the thread may share the same memory space with other threads concurrently running in the process. The TLS pointer that is stored at instructions 308 in trampoline 108 is for thread local storage associated with the thread executing the function call.

At 310, trampoline 108 uses the TLS pointer to locate thread local storage. Then, information that can be used to identify the calling function is stored. For example, a stack pointer in a call stack for call site 302 is stored in thread local storage. The stack pointer identifies a position in the call stack that includes an address in memory 102 (FIG. 2) for the calling function. In one example, a minimum set of registers that are storing stack pointers for call site 302 are stored in thread local storage and may include a stack pointer (ESP or RSP) and base pointer (EBP or RBP). Additionally, a base register (such as EBX) may be saved on platforms that use a 32-bit position independent code. Although these registers are described as being saved, other registers may be used to determine a position of call site 302. In one embodiment, selective registers are saved that are needed to determine the position in the call stack for the call site.

At 312, trampoline 108 then calls the library function in libraries 106. The library function called at instruction 312 is the same library function originally called from call site 302. For example, trampoline 108 makes an absolute jump to the library function originally called from call site 302 using an address computed at runtime. If no fault occurs in the library function, then the process resumes normally and is returned to call site 302 through inlined macro 304. Inlined macro 304 also nulls or removes the saved stack pointer in thread local storage using the thread local storage address saved in the reserved register at 328. This indicates that the process 216 is no longer executing the library function. Thus, if a crash were to occur, it is handled normally without the special fault handling that is performed when a fault occurs inside library function 106. This return from the library function may be handled in one instruction at 328 to clear the reserved register, which provides low overhead as compared with previous methods described above.

At 314, if a fault were to occur while in the library function, a handler 316 is invoked. Handler 316 may be operating-system specific, such as a structured exception handler (SEH) or a single signal handler on a portable operating system interface (POSIX) in UNIX-based operating systems. If a fault occurs, handler 316 may use the thread local storage to determine whether or not the fault occurred within the duration of time that this function was executing, and whether the fault occurred on the same thread where this function was executing. Providing that the fault did occur during the execution of this function, handler 316 uses the thread local storage to identify the calling function. At 318, handler 316 determines which calling instruction called the library function. As will be described in more detail below, the TLS pointer stored in the reserved register is used to determine thread local storage. The stack pointer saved in thread local storage is then used to look up the calling instruction that is part of inlined macro 304. The address of trampoline 108 is then determined by reading the machine code for the calling instruction. In one embodiment, trampoline 108 may be specific to each library function. For example, a specific trampoline is created for each the library function. In one embodiment, although the library function may be called from different calling instructions, the same trampoline 108 is used to call the library function. The trampoline 108/library function relationship may be used to identify the library function. Thus, once trampoline 108 can be identified, the associated library function can be identified. This identification may be performed using a table, which is computed at compile-time, or during the creation of a dynamic trampoline 108.

At 320, information about the fault is gathered and crash handler 322 is called. Library functions may be associated with corresponding crash handlers 322, and a specific crash handler 322 for the crashed library function may be called. Information for the calling function or library function may then be used in a crash handler 322 to process the fault. For example, at 324, crash handler 322 may log the fault and also modify trampoline 108. Example modifications include changing library bindings to switch library versions or to stop using the library function altogether. These examples change the operation of trampoline 108.

When crash handler 322 is finished, at 326, handler 316 may return from the crashed library function. The stack pointers stored in thread local storage may be used to resume execution at an instruction, such as the first instruction, after the calling function. For example, an address for call site 302 is used to determine the first instruction after the library function call. Inlined macro 304 may have been inserted into application code 104 and, in one example, the process is returned to inlined macro 304. For example, the process returns to an instruction after the trampoline call at 306. At 328, inlined macro 304 removes the saved stack pointer in thread local storage via the thread local storage address saved in the reserved register. This also indicates that the process is no longer inside the library function. After removing the stack pointer, the process proceeds after the calling instruction in application code 104, such as at an instruction after inlined macro 304. Thus, the execution state of application code 104 is restored to simulate returning from the function call.

Figure 4:
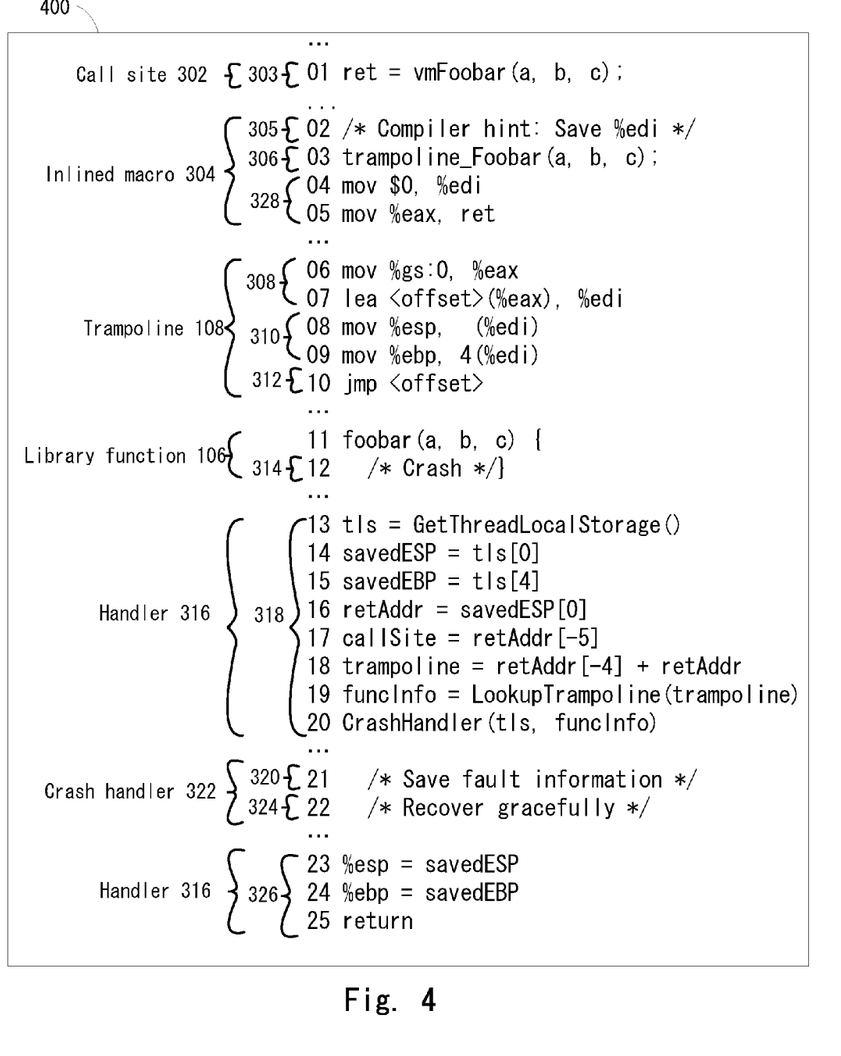
FIG. 4 depicts an example of pseudocode of an algorithm implementing the events in FIG. 3 according to one embodiment.

FIG. 4 depicts an example of pseudocode 400 of an algorithm implementing showing the events of FIG. 3 according to one embodiment. Lines of pseudocode 400 include marks "/*" and "*/" which demarcate comments that may represent a general description of processing that is being performed but which or do not form part of the algorithm being described. Like reference numbers for lines of pseudocode 400 refer to events or entities shown in FIG. 3.

At 303, line 1 of pseudocode 400 calls the library function. The calling function executes the code from inlined macro 304. At 305, line 2 represents a compiler hint to not use register "% edi" across the function call, thereby freeing it for use by trampoline 108. At 306, line 3 then calls trampoline 108.

In trampoline 108, at 308, lines 6 and 7 save a pointer to thread local storage in the reserved register (% edi).

At 310, lines 8 and 9 then store stack pointers into thread local storage. In this case, the stack pointers are stored via the reserved register. At 312, line 10 calls the original library function. The library function is executed and at 314, a comment at line 12 indicates a fault has occurred while in the library function. If a successful return from the library function occurs, at 328, lines 4 and 5 may be used to null the stack pointers in thread local storage. Then, execution after the library function call is resumed in application code 104 after inlined macro 304.

The fault causes handler 316 to be called. Lines 13-15 examine thread local storage to determine the stack pointers that are saved. Line 16 determines an address to the calling instruction found on line 3 of inlined macro 304. On line 17, the instruction on line 3 is then decoded to retrieve the address of trampoline 108. Line 18 then looks up the address of trampoline 108 in a global table. Line 19 uses the address of trampoline 108 to retrieve information about the library function. For example, as described above, trampoline 108 is associated with a specific library function and the address of trampoline is used to determine the associated library function. Information is then gathered to determine about the library function. For example, at 320, a crash handler 322 that can handle the fault is determined and called at line 20.

At 324, crash handler 322 saves fault information and recovers gracefully. After the recovery, the saved registers are used to return from the crashed library function. For example, lines 23-25 determine the stack pointers for call site 302 and are used to resume execution on the first instruction after the library function call. At 328, lines 4 and 5 may be used to null the stack pointers in thread local storage. Then, execution after the library function call is resumed in application code 104 after inlined macro 304.

Figure 5:
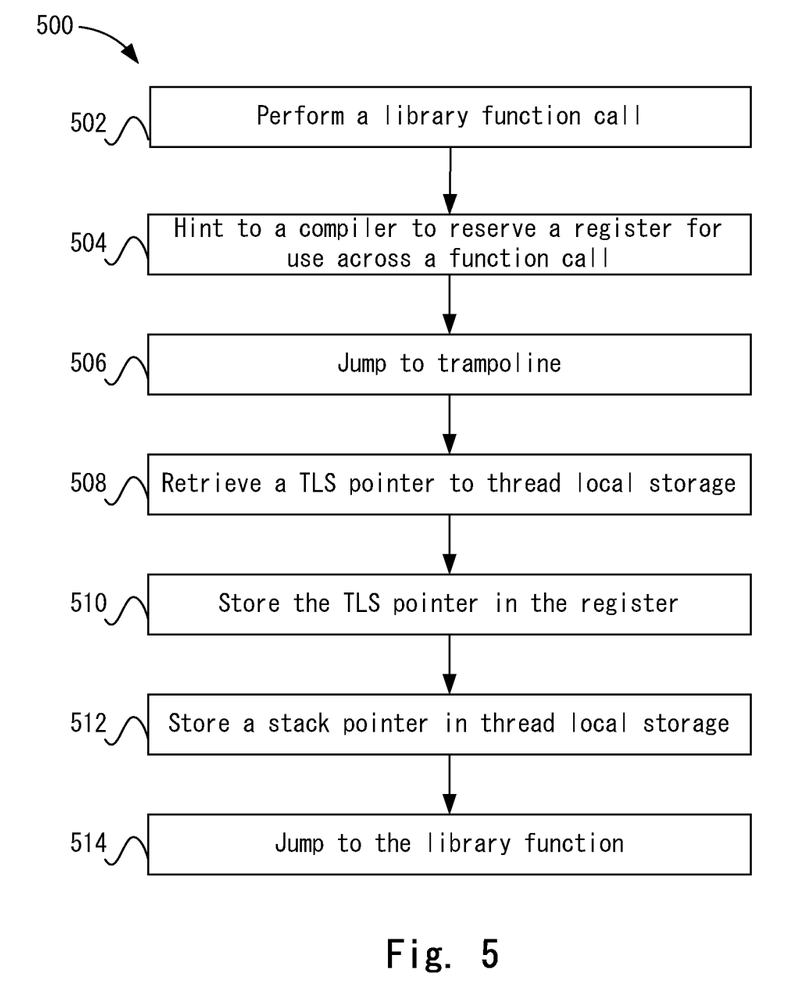
FIG. 5 depicts a simplified flowchart of a method for processing a library function call according to one embodiment.
Figure 6:
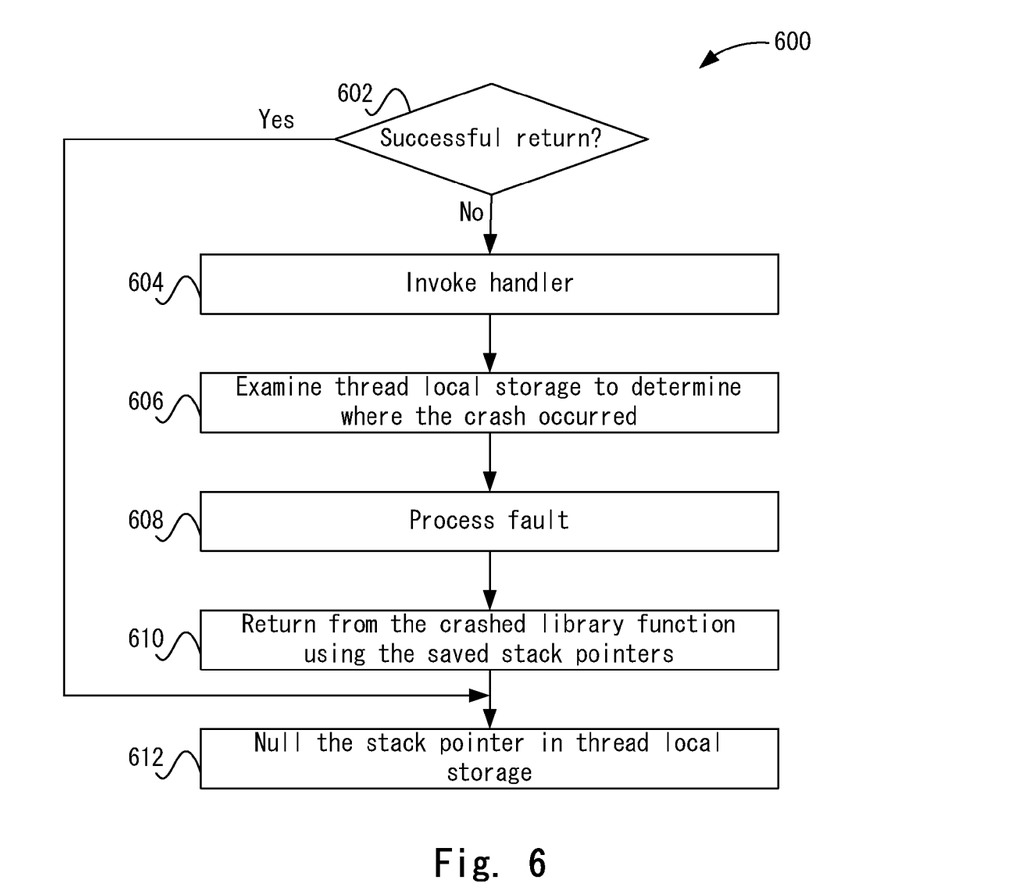
FIG. 6 depicts a simplified flowchart for handling faults according to one embodiment.

FIGS. 5 and 6 describe a more general view of the processing of a library call and fault handling for pseudocode 400. FIG. 5 depicts a simplified flowchart 500 of a method for processing a library function call according to one embodiment. At 502, a library function call is performed at call site 302. The library function call may be calling an unreliable third-party library.

At 504, an inlined macro 304 hints to a compiler to reserve a register for use across a function call. The hint may indicate a register may not be preserved across the function call. At runtime, the effect of operation 504 is to reserve the use of one or more registers for use by trampoline 108. The compiler hint, which is provided at compile time, causes the compiler to avoid using that register during runtime, freeing it for use by trampoline 108.

At 506, the method jumps to trampoline 108. Trampoline 108 may be dynamically generated at runtime. In another embodiment, trampoline 108 may be found in binary code for the program.

At 508, a TLS pointer to thread local storage is retrieved. A variety of methods may be used to retrieve the TLS pointer. For example, runtime inlining of code from a standard library of host operating system 202 may be used. This may require a single CPU instruction to determine the TLS pointer to thread local storage. At 510, the method stores the TLS pointer in the reserved register.

At 512, the method stores a stack pointer in thread local storage. For example, a minimum amount of registers that include stack pointers that are needed to return from a fault in the library function may be stored.

At 514, a jump to the library function is performed. The jump to the library function may be an absolute jump to the beginning of library function 106. The jump may use an address computed at runtime, which may bypass overhead associated with dynamic linking.

FIG. 6 depicts a simplified flowchart 600 for handling faults according to one embodiment. At 602, a method determines if the library function returned successfully. If the library function returned to trampoline 108 successfully, at 612, the stack pointer in thread local storage is nulled. This indicates that the software program is no longer in the library function and the crash can be handled without any special hooks being invoked.

If a fault occurs, then at 604, handler 316 is invoked. At 606, handler 316 examines thread local storage to determine where the crash occurred. For example, a calling function and library function are determined as described above.

At 608, the fault is processed by crash handler 322. As described above, different actions may be performed such as logging the crash and changing actions of trampoline 108.

At 610, a return from the crashed library function is performed using the saved stack pointer. For example, the saved stack pointer in thread local storage is used to determine the calling instruction in inlined macro 304. Then, at 612, the stack pointer in thread local storage is nulled. After the stack pointer is nulled, Then, execution after the library function call is resumed in application code 104 after inlined macro 304.

Figure 7A:
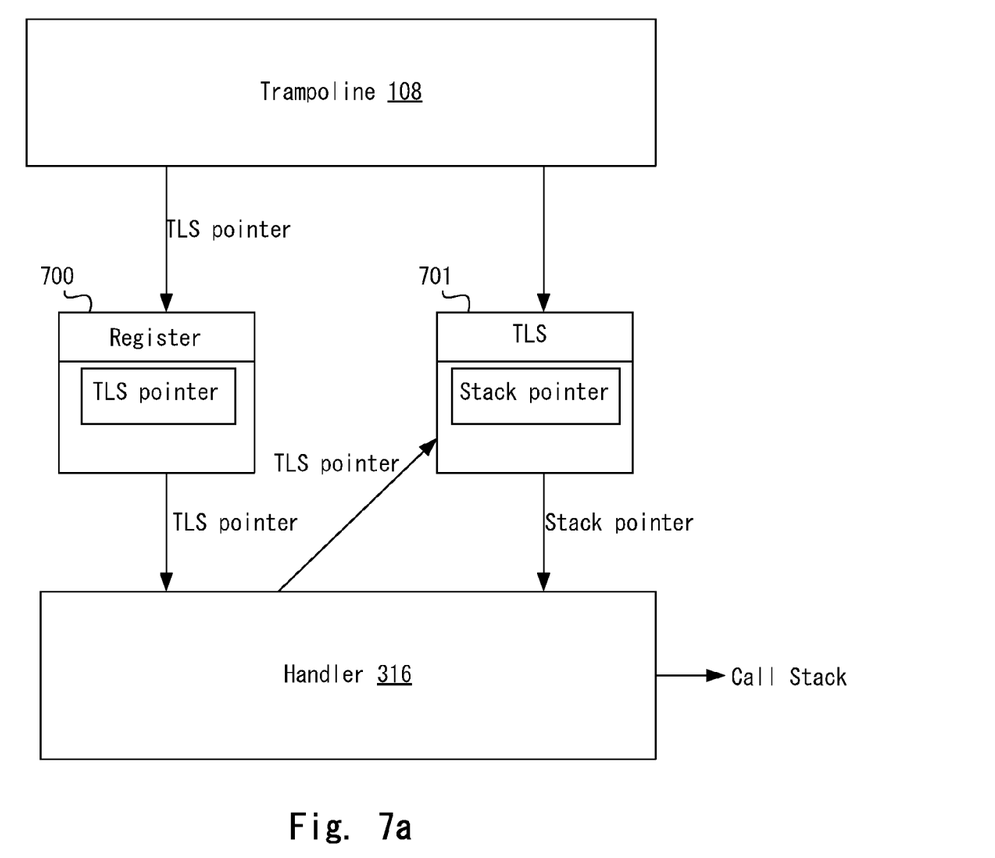
FIG. 7a depicts the use of a reserved register and thread local storage (TLS) according to one embodiment.

The interaction with the reserved registers and thread local storage along with an illustration of the call stack to perform the recovery process will now be described. FIG. 7a depicts the use of a reserved register 700 and thread local storage (TLS) 701 according to one embodiment. Trampoline 108 saves the TLS pointer to thread local storage into register 700. Also, trampoline 108 saves a stack pointer to call site 302 in thread local storage 701.

After a fault occurs, handler 316 retrieves the TLS pointer from register 700. The TLS pointer is then used to determine a location for thread local storage 701. The saved stack pointer is then retrieved.

Figure 7B:
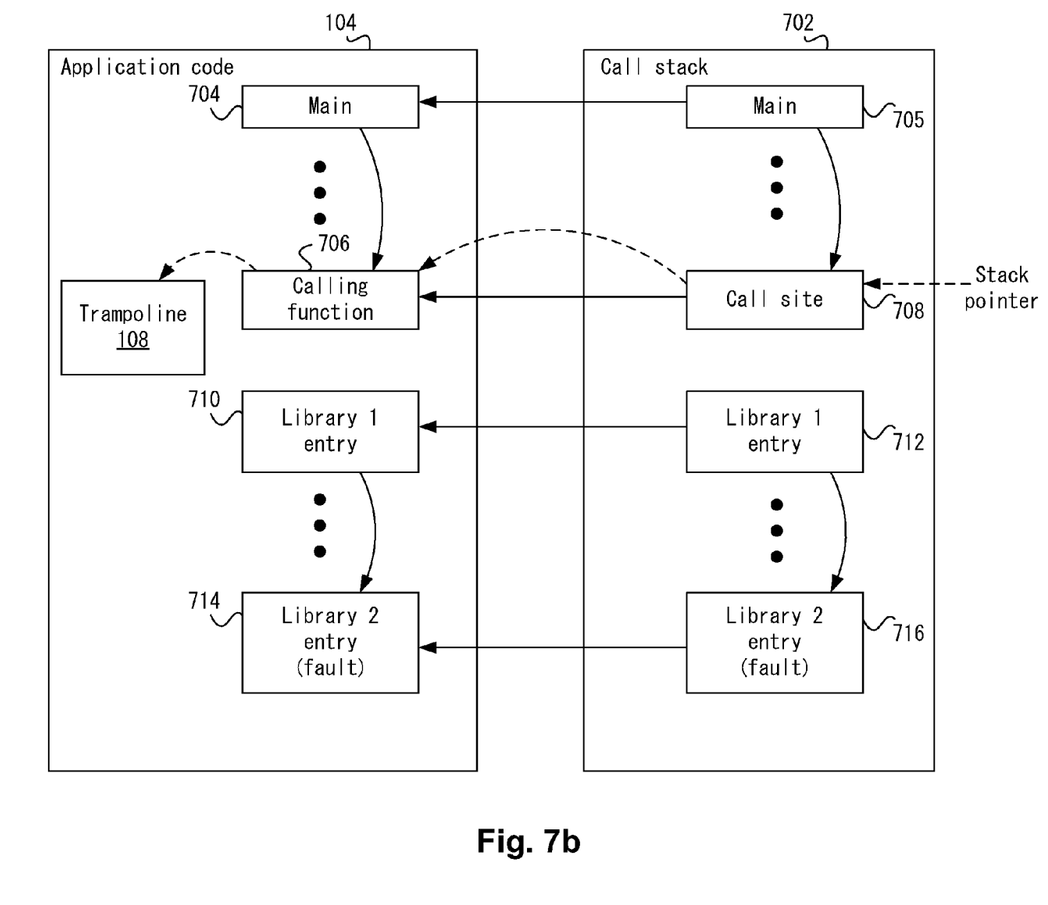
FIG. 7b depicts an example of a call stack according to one embodiment.

Handler 316 uses the saved stack pointer to determine the calling function that called the library function that crashed. A call stack is used to illustrate this process. FIG. 7b depicts an example of a call stack 702 according to one embodiment. Instructions being executed are shown under application code 104 and entries in the call stack are shown under call stack 702. Call stack 702 saves return addresses for all function calls as generally understood. As function calls are executed, return addresses are inserted onto call stack 702. When a function returns, a corresponding address is removed from call stack 702.

The process of generating the entries on call stack 702 is shown with solid arrows and the recovery process is shown with dotted arrows. At 704, main indicates that the program has been invoked. At 705, an entry on call stack 702 is an address pointing to a corresponding instruction in application code 104. At 706, calling function 706 in application code 104 calls a library function. Calling function 706 may be a calling instruction that calls the first library (library 1). An address is stored for a call site at 708. The calling function at 706 also uses trampoline 108 to store the stack pointers. Trampoline 108 does not call a function to save the stack pointers and thus an entry on call stack 702 for trampoline 108 is not inserted.

At 710, an entry into a first library is performed. An address for library 1 entry is stored in call stack 702 at 712. Different libraries may call other libraries and these addresses may be stored on call stack 702. In one example, at 714, entry into a library 2 has been performed and an address for the library 2 entry is stored at 716. A fault then occurs in library 2.

In the recovery process, handler 306 uses the saved stack pointer in TLS to identify a position in call stack 702, which is to the call site at 708. The address to the call site at 708 is then used to identify the address of an instruction (e.g., the calling function at 706) used to call the crashed library function. If multiple nested library calls have been made, the call site at 708 that called library 1 entry is determined. This determines the first calling function that called the first library. This instruction is decoded to retrieve the address of trampoline 108. The library function associated with trampoline 108 is then determined.

As shown, particular embodiments do not add entries onto a call stack when trampoline 108 is called. This is different from implementations which use a wrapper function which is comprised of code to both set and zero the saved stack pointer. By saving the TLS pointer in a reserved register and zeroing the saved stack pointer after returning to the call site, the embodiment avoids allocating an additional stack frame or copying the library function arguments. Additionally, in 64-bit environments, any additional function calls made in a trampoline or wrapper would necessitate saving and restoring parameters that were passed in registers. By using inlined TLS code, instead of making library function calls, these extra save/restore instructions are avoided.

Figure 8:
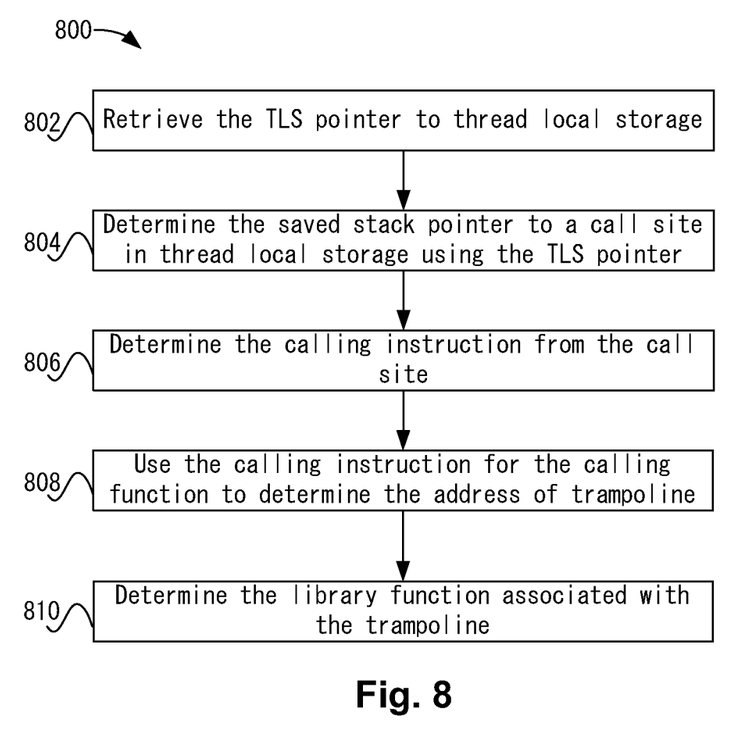
FIG. 8 depicts a simplified flowchart of a method for determining the calling function when a fault occurs according to one embodiment.

FIG. 8 depicts a simplified flowchart 800 of a method for determining the library function when a fault occurs according to one embodiment. At 802, handler 316 determines the TLS pointer to thread local storage 701.

At 804, handler 316 retrieves the saved stack pointer to call site 508 in thread local storage 701 using the TLS pointer. At 806, calling instruction is determined from call site 708. For example, the address of the calling instruction in inlined macro 304 is determined from call site 708. At 808, the calling instruction is used to determine the address of trampoline 108. At 810, the library function associated with trampoline 108 is determined.

Accordingly, a low overhead process is provided for fault recovery by saving execution state in thread local storage. A compiler hint is used to reserve registers that that store a pointer to thread local storage. Reserving the registers allows thread local storage to be determined. The calling function is determined without using setjmp or longjmp functions, which reduces overhead and does not add additional entries to a call stack. Also, the saved stack pointer may be nulled using one instruction, which further reduces overhead.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method for executing, using a computing device, a function that contains unreliable code, the method comprising:
    after execution by a thread of an instruction for invoking the function, storing a pointer to thread local storage for the thread in one or more reserved registers, the thread local storage being a portion of memory of the computing device associated with the thread;
    storing in the thread local storage a stack pointer to a position in a call stack associated with the instruction for invoking the function;
    calling the function, thereby causing the function to execute; and
    in response to a fault occurring in the function, using, by the computing device, the pointer to thread local storage to retrieve the stack pointer in the thread local storage, wherein the position in the call stack is used in a recovery process for the fault.

2. The method of claim 1, wherein the one or more reserved registers are reserved by hinting to a compiler that the one or more registers are not to be preserved across the function call.

3. The method of claim 1, wherein the storing of the pointer to the thread local storage and the storing of the stack pointer does not generate an entry on the call stack.

4. The method of claim 1, further comprising jumping to a trampoline configured to perform the storing of the local storage pointer and the storing of the stack pointer.

5. The method of claim 4, further comprising using an inlined macro inserted by a compiler to reserve the one or more registers and call the trampoline.

6. The method of claim 4, further comprising dynamically generating the trampoline at run-time.

7. The method of claim 4, wherein the trampoline performs the calling of the function after the storing of the pointer to the thread local storage and the stack pointer.

8. The method of claim 4, wherein the recovery process comprises causing, on another function call, the trampoline to call the function differently based on information determined for the fault.

9. The method of claim 1, further comprising nulling the stack pointer stored in the thread local storage when execution returns from the function.

10. The method of claim 1, wherein the recovery process comprises determining a calling instruction that called the function in which the fault occurred, the calling instruction determined using the stored stack pointer.

11. The method of claim 10, wherein the recovery process further comprises:
    determining a first address for the calling instruction based on the stored stack pointer;
    determining a second address for a trampoline associated with the calling instruction; and
    identifying the function by an association of the trampoline with the function.

12. The method of claim 1, further comprising using the stored stack pointer to return to execution of an instruction after the instruction invoking the function.

13. The method of claim 1, wherein the function is contained in a dynamically loaded library comprising the unreliable code.

14. The method of claim 1, further comprising:
    loading application code into the memory, the application code including instructions executed by the thread; and
    loading function code for the function from the memory, wherein the function is not dynamically linked to the application code during the loading of function code for the function.

15. The method of claim 1, wherein a virtual machine is associated with the execution of the thread, wherein the recovery process allows recovery from the fault for the virtual machine.

16. A non-transitory computer-readable storage medium containing instructions for executing, using a computing device, a function that contains unreliable code, the instructions for controlling a computer system to be operable to:
    after execution by a thread of an instruction for invoking the function, store a pointer to thread local storage for the thread in one or more reserved registers, the thread local storage being a portion of memory of the computing device associated with the thread;
    store in the thread local storage a stack pointer to a position in a call stack associated with the instruction for invoking the function;
    call the function, thereby causing the function to execute; and
    in response to a fault occurring in the function, use, by the computing device, the pointer to thread local storage to retrieve the stack pointer in the thread local storage, wherein the position in the call stack is used in a recovery process for the fault.

17. The computer-readable storage medium of claim 16, wherein the one or more reserved registers are reserved by hinting to a compiler that the one or more registers are not to be preserved across the function call.

18. The computer-readable storage medium of claim 16, wherein controlling the computer system to be operable to store the pointer to the thread local storage and store the stack pointer does not generate an entry on the call stack.

19. The computer-readable storage medium of claim 16, further comprising controlling the computer system to be operable to jump to a trampoline configured to perform the storing of the local storage pointer and the storing of the stack pointer.

20. The computer-readable storage medium of claim 16, further comprising controlling the computer system to be operable to null the stack pointer stored in the thread local storage when execution returns from the function.

21. The computer-readable storage medium of claim 16, wherein the recovery process comprises controlling the computer system to be operable to determine a calling instruction that called the function in which the fault occurred, the calling instruction determined using the stored stack pointer.

22. The computer-readable storage medium of claim 21, wherein recovery process further comprises controlling the computer system to be operable to:
   determine a first address for the calling instruction based on the stored stack pointer;
   determine a second address for a trampoline associated with the calling instruction; and
   identify the function by an association of the trampoline with the function.

23. The computer-readable storage medium of claim 16, further comprising controlling the computer system to be operable to use the stored stack pointer to return to execution of an instruction after the instruction invoking the function.

24. An apparatus comprising:
   one or more computer processors; and
   a computer-readable storage medium comprising instructions for executing, using a computing device, a function that contains unreliable code, the instructions for controlling the one or more computer processors to be operable to:
   after execution by a thread of an instruction for invoking the function, store a pointer to thread local storage for the thread in one or more reserved registers, the thread local storage being a portion of memory of the computing device associated with the thread;
   store in the thread local storage a stack pointer to a position in a call stack associated with the instruction for invoking the function;
   call the function, thereby causing the function to execute; and
   in response to a fault occurring in the function, use, by the computing device, the pointer to thread local storage to retrieve the stack pointer in the thread local storage, wherein the position in the call stack is used in a recovery process for the fault.

* * * * *